United States Patent
Marion

[11] Patent Number: 5,819,082
[45] Date of Patent: Oct. 6, 1998

[54] DATA STORAGE OPTIMIZATION USING AN ACCESS ORDER RESOURCE LIST

[75] Inventor: Mark Marion, Redmond, Wash.

[73] Assignee: Sierra On-Line, Inc., Bellevue, Wash.

[21] Appl. No.: 480,618

[22] Filed: Jun. 7, 1995

[51] Int. Cl.⁶ ............................................. G06F 17/30
[52] U.S. Cl. ............................................. 395/607; 395/322
[58] Field of Search ..................................... 395/607, 622

[56] References Cited

U.S. PATENT DOCUMENTS

| | | | |
|---|---|---|---|
| 4,587,628 | 5/1986 | Archer et al. | 395/682 |
| 4,760,526 | 7/1988 | Takeda et al. | 395/607 |
| 5,193,207 | 3/1993 | Vander Vegt et al. | 395/800 |
| 5,274,805 | 12/1993 | Ferguson et al. | 395/607 |
| 5,357,604 | 10/1994 | San et al. | 395/162 |
| 5,396,631 | 3/1995 | Hayashi et al. | 395/700 |
| 5,411,258 | 5/1995 | Wilson et al. | 273/86 B |
| 5,414,842 | 5/1995 | Archer et al. | 395/607 |
| 5,592,669 | 1/1997 | Robinson et al. | 395/622 |

*Primary Examiner*—Wayne Amsbury
*Attorney, Agent, or Firm*—LaRiviere, Grubman & Payne

[57] ABSTRACT

Method and apparatus for optimizing file structures stored on a memory device operatively associated with a computer. Particularly suited to optimizing individual resources within a given file to minimize seek and access time of the storage device, the present invention significantly improves execution speed of computer programs stored on CD-ROM disks. A resource optimizer first lists each resource of a given file as it is accessed, thereby forming a sequential listing of the several resources in order accessed. This list is then appended to the file. A resource arranger is then run which accesses the sequential listing and re-writes the file in access order. As the rewritten files are in resource access order, they improve the execution speed of the application program.

15 Claims, 2 Drawing Sheets

FIG. 2

```
CREATE RES_LST
DO WHILE GET RESOURCE (TYPE, ID)
   IF RESOURCE NOT IN RES_LST
      APPEND (TYPE, ID) TO RES_LST
   END IF
END DO
```

FIG. 3

```
CREATE VERSION 3 FILE
DO WHILE FILE
   DO WHILE RESOURCE
      APPEND RESOURCE TO VERSION 3 FILE
   END DO
END DO
```

DATA STORAGE OPTIMIZATION USING AN ACCESS ORDER RESOURCE LIST

TECHNICAL FIELD

The present invention relates to a method for optimizing file structures stored on a memory device operatively associated with a computer. Particularly suited to optimizing individual resources within a given file to minimize seek and access time of the storage device, the present invention significantly improves execution speed of computer programs stored on CD-ROM disks.

BACKGROUND ART

Information used by programmable computers, including data and executable programs, are typically stored on some form of memory device. Each type of current art memory storage device presents the user with certain trade-offs regarding cost, speed of information retrieval, and capacity. Electronic memory devices, particularly random access memory (RAM), typically offer the user very fast data access. This high speed data access, however, is both limited in maximum capacity and expensive. Magnetic recording media, including tapes, diskettes, and magnetic hard drives, present the user with somewhat slower access times, but are more cost effective than large electronic storage methodologies.

In order to transfer computer programs and data users, including software developers and marketers, have long shipped those programs and data on magnetic diskettes. These diskettes are typically inexpensive to procure, but have limited data storage capabilities. Large computer programs, for instance, which are shipped on magnetic media, typically require many diskettes to contain the entire program or data set. The cost of recording many diskettes for each program sold is a cost factor which must be considered by a software developer or manufacturer.

In order to overcome the previously discussed limitations of storage capacity per diskette, the use of CD-ROM technology has gained wide acceptance in the software industry. Where a single 3.5" magnetic floppy diskette is capable of holding typically a maximum of 1.44 Mbyte, a single CD-ROM can typically hold upwards of 600 Mbytes of information. The previously discussed trade offs again apply, however, in that while CD-ROM production is very cost effective and the devices themselves hold large amounts of data, the access time to that data is typically slower than that encountered on magnetic hard drives and much slower than data retrieval from electronic storage means.

The relatively slow access imposed by CD-ROM technology can translate to extremely long delays in program execution as the program accesses data which is randomly stored on the CD-ROM. In some resource intensive applications, for instance computerized games, randomly storing data which is subsequently accessed by the program on CD-ROM, results in significant delay in program execution and adversely affects the game's playability.

Many applications, including the aforementioned computerized games, access the data files required for their execution in a non-random manner. Because there is a degree of predictability to the access order of at least some of the data stored in the memory device, an automated methodology which would optimize the order in which the data was stored would result in significant improvements in program execution speed.

SUMMARY OF INVENTION

The present invention provides a method for optimizing the storage of data elements accessed by a computer application program. More particularly, the present invention is applicable to the optimizing of the storage of data elements or sub-files, hereafter referred to as "resources", within a file.

The automated methodology taught herein contains two principal programmatic elements which, in operative combination, optimize the storage order of resources within a given data file. The first element modifies one version of the application program so that a separate file is created, which lists each resource in sequential order as it is accessed from the first version of the data file. The listing is by the resource type and identification number. The modified version of the application, or executable, program is referred to hereafter as the "Resource Optimizer", or "debug version". The list created by the Resource Optimizer, hereafter referred to as a "resource list", thus contains a sequential listing of the several resources of a given data file as they are accessed. The resource list does not contain the resource data itself. After the resource list is created, it is appended to the data file itself, as a separate resource, thus creating a second version of the data file.

After the resource list has been appended to the data file, the second programmatic element, typically a separate executable program and hereafter referred to as a "Resource Arranger" is then executed. The Resource Arranger accesses each file accessed by the executable program, and creates a third version of each data file having the several resources thereof, including the resource list, stored in resource list order.

Other features of the present invention are disclosed or apparent in the section entitled: "BEST MODE FOR CARRYING OUT THE INVENTION."

BRIEF DESCRIPTION OF DRAWINGS

For fuller understanding of the present invention, reference is made to the accompanying drawing in the following detailed description of the Best Mode of Carrying Out the Invention. In the drawing:

FIG. 2 is a data flow diagram of the Resource Optimizer code of the present invention.

FIG. 3 is a data flow diagram of the Resource Arranger code of the present invention.

Figure 1:
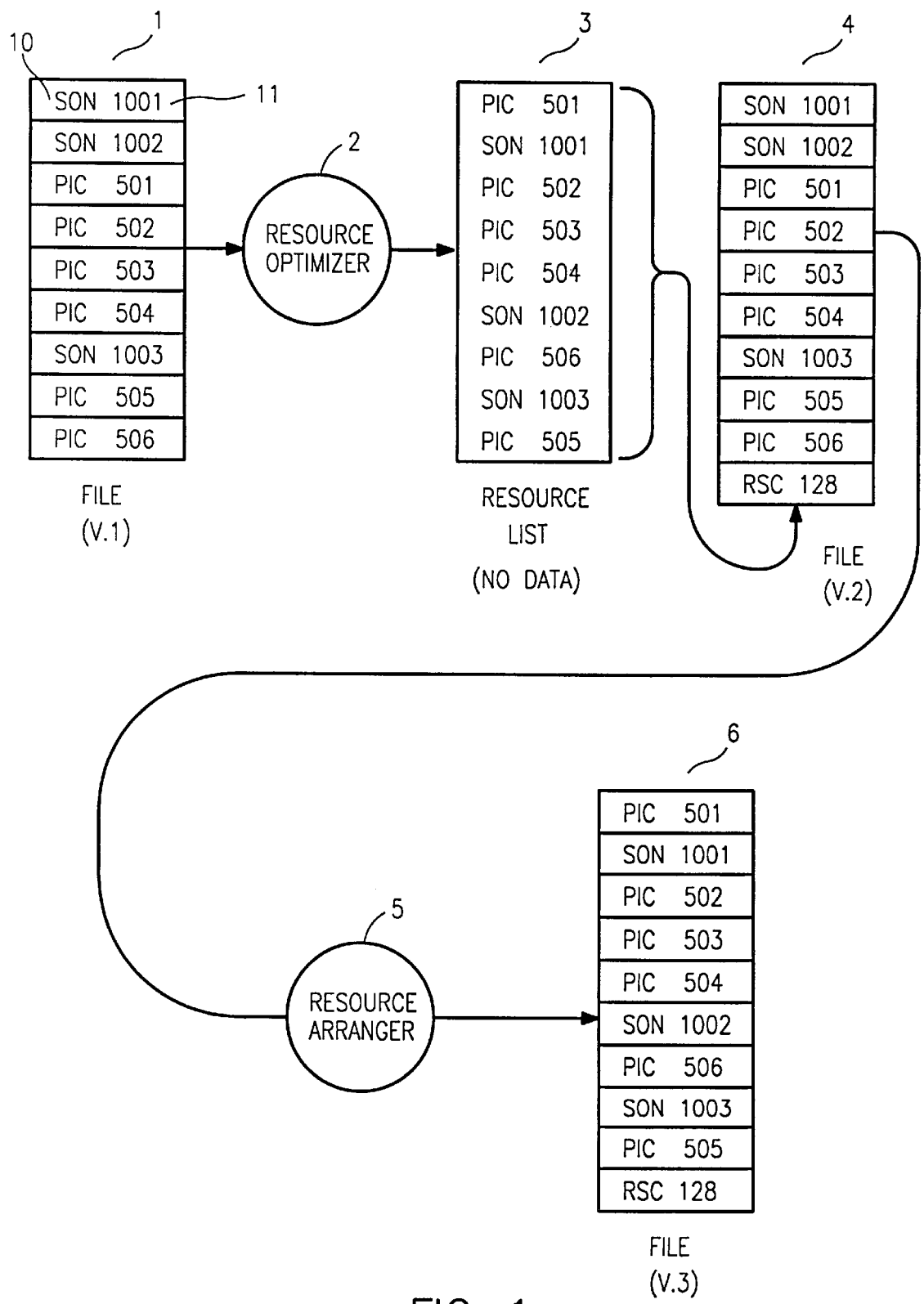
FIG. 1 is an overview of the operation of the present invention.

Reference numbers refer to the same or equivalent parts of the present invention throughout the several figures of the drawing.

BEST MODE FOR CARRYING OUT THE PRESENT INVENTION

A given computer program, for instance, a computerized game, accesses one or more files, most of which contain a plurality of resources. By way of example, but not limitation, a computer game may access a file, e.g., OPN_SCREEN, which comprises a number of sound and graphics resources. When the file is created, the various resources stored therein are generally stored in the file in their creation order, i.e., the order in which they are created. It is seldom the case that this order is the order most optimally accessed by the executable program.

The first programmatic element of the present invention comprises a modification to the application program itself, hereafter referred to as the "debug" or "Resource Optimizer" version of the application program.

Referring now to FIG. 1, the operation of the present invention is shown. Version 1 of data file 1 contains a plurality of sound and picture resources in some random order, e.g. their creation order. Each resource in data file 1, e.g.: SON 1001, is uniquely identified by its resource type 10, e.g. SON, in combination with its resource identification number 11, e.g. 1001. The Resource Optimizer, 2, when executed causes the creation of a resource list 3. Resource list 3 consists of a listing, by resource type and I.D. number, of each resource in the order in which each was accessed by the executable program. This listing is unique: i.e., a given resource is listed only once in the resource file. It should be noted that resource list 3 contains only resource identification information and no data. After forming resource list 3, Resource Optimizer 2 appends resource list 3 as a separate resource to file 1 at step 4, thereby creating a second version of the data file. In this example, resource list 3 is appended as resource RSC 128 at the end of file 4.

After the Resource Optimizer has accessed each file required for program execution, and each file has had a resource list created and appended thereto as a separate resource, a separate programmatic element, the Resource Arranger 5, is executed. Resource Arranger 5 recreates a third version of the data file, 6, in resource list order. That is to say, all of the resources stored in data file 4 are recreated as a separate data file, wherein the several resources thereof are stored in resource list order. It will be noted that Resource List RSC 128 is again appended at the end of the optimized file.

Having reference now to FIG. 2, the modifications to the application program required to form the Resource Optimizer are discussed. At each instance where a program command requires accessing a given resource, e.g.: the GET RESOURCE command of the Macintosh operating system or the FIND, LOAD and LOCK RESOURCE commands of the DOS operating system, a determination is made if the resource accessed by the command is contained in the resource list. If the resource is not contained in the resource list, the resource's type and I.D. number are appended to the resource list, and program execution continues to the next GET RESOURCE command. In this manner, the resource list contains a listing of the several resources accessed by the Resource Optimizer 2 in the order in which they are accessed. Each GET RESOURCE command of the Resource Optimizer version of the executable program is similarly modified.

Referring now to FIG. 3, the Resource Arranger program is detailed. Resource Arranger 5 accesses the resource list contained as a resource list file type from the version 2 file created by the Resource Optimizer. The Resource Arranger reads each type and I.D. number from the resource list and appends the resource to a third version of the file. This version includes each resource identified by its type and I.D. number in the order in which it was accessed by the Resource Optimizer. Finally, resource list 128 is appended at the end of the Version 3 file.

The preceding invention may be further enhanced. Having continued reference to FIG. 2, the modifications discussed therein may be "settable" by means of a flag. If the version of the executable program being executed is the Resource Optimizer version, the flag is set and the previously discussed modifications compiled along with the GET RESOURCE command. If the version of the executable program being executed is the release version of the program, the previously discussed flag is not set, and the modifications are not compiled with the GET RESOURCE commands and hence do not slow execution of the application.

A further modification of the present invention addresses the issue of very small resources, especially small resources which are accessed at many instances during execution of at least a portion of the program, for instance during execution of a subroutine. In this case, very small resources may be removed from the several files in which they are located and rewritten into a separate file or implemented into memory. In many applications programs utilizing the present invention, small resources are normally preloaded into memory. These very small resources are then left in memory for very rapid access for the duration of at least one subroutine of the application program. In either case, program execution is further enhanced.

The previously discussed method may implemented on any of a variety of standard, general purpose, programmable digital computers, or may alternatively be implemented in special purpose hardware. Well known general purpose computers typically include a processor, data storage device, memory, and at least one data bus. Commonly attached to, and operatively associated with such general purpose computers are visual displays, and signal input devices, and mass storage devices. By way of illustration, but not limitation, the general purpose computers suitable for use with the present invention include IBM and compatible systems, Apple Macintosh and compatible systems, and Commodore Amiga systems.

By configuring any general or special purpose computer with software implementing the methodology previously discussed, those computers become apparatus suitable for carrying out the method of the present invention. Again, in illustration but not limitation, an executable program may be input into the memory of the computer system via mass storage device or signal input device. After being so loaded, it may modified to include the Resource Optimizer of the present invention. As the program is executed by the processor, data bus and memory in operative combination, perform the previously discussed method for optimizing data storage.

The present invention has been particularly shown and described with respect to certain preferred embodiments and features thereof. However, it will be readily apparent to those of ordinary skill in the art that various changes and modifications in form and detail may be made without departing from the spirit and scope of the inventions as set forth in the appended claims. The inventions illustratively disclosed herein may be practiced without any element which is not specifically disclosed herein. Alternative programming languages, file descriptions, sub-file descriptions and specific programming commands not identically disclosed herein are specifically contemplated in forming the resource optimizing strategy of the present invention.

I claim:

1. A method for improving the execution speed of an application program by optimizing the storage order of a plurality of data elements within a first data file accessed by said application program, said optimization accomplished by creating a second data file as a listing of said data elements of said first data file in the order in which said data elements are accessed by said application program, the method comprising the steps of:

modifying said application program to create a resource list, said resource list for containing a listing of said several data elements of said data file in the order which they are first accessed by said application program;

executing said application program, thereby creating said resource list;

appending said resource list to said first data file; and creating said second data file from said first data file, said second data file having said data elements stored therein in the order said data elements are listed in said resource list.

2. The method of claim 1, responsive to said step of creating said second data file from said first data file, the method comprising the further step of executing said application program accessing said second data file.

3. The method of claim 1 wherein said step of executing said application program comprises the further steps of:

sequentially accessing said data elements in said first data file;

for each data element in said first data file accessed by said application program, determining if said data element is contained in said resource list; and responsive a determination by said determining step that said data element is not contained in said resource list, listing said data element in said resource list.

4. The method of claim 3 wherein said listing step comprises the further step of listing said data element by data type and identification number.

5. The method of claim 1 wherein said appending step comprises the further step of appending said resource list to said first data file as a data element.

6. The method of claim 1 wherein said step of creating said second data file comprises the further step of:

for each data element listed in said resource file, appending said data element to said second data file.

7. Apparatus including processor, data storage device, memory, and at least one data bus, for improving the execution speed of an application program implementable on said apparatus, said application program accessing a plurality of data elements within a first data file implemented on said memory, said apparatus further for optimizing the storage order of said plurality of data elements and comprising:

second data file means for creating, from said first data file, a second data file implemented on said memory, said second data file including a listing of said plurality of data elements from said first data program in the order in which said plurality of data elements are accessed by said application program, said data file means including (a) application program modification means for modifying said application program to create a resource list, said resource list for containing a listing of said plurality of data elements of said first data file in the order which said plurality of data elements are first accessed by said application program, (b) means for executing said application said program, thereby creating said resource list, (c) resource list appending means for appending said resource list to said first data file, and (d) data file creation means for creating said second data file having said plurality of data elements stored therein in the order in which said plurality of said data elements are listed in said resource file.

8. The apparatus of claim 7 further comprising means for executing said application program utilizing said second data file.

9. The apparatus of claim 7 wherein said means for executing said application program further comprises:

means for accessing said data elements in execution order;

determination means for determining if each of said data elements accessed by said application program is contained in said resource list; and responsive a determination by said determining means that said data element is not contained in said resource list, list means for listing said data element in said resource list.

10. The apparatus of claim 9 wherein said list means further comprises means for listing said data element by data type and identification number.

11. The apparatus of claim 7 wherein said resource list appending means further comprises means for appending said resource list to said data file as a data element.

12. The apparatus of claim 7 wherein said data file creation means further comprises means for appending for each data element listed in said resource file to said second data file.

13. A method for improving the execution speed of an application program by optimizing the storage order of a plurality of data elements within a first data file accessed by an application program, the method for creating a second data file containing said data elements in the order in which said data elements are accessed by said application program, said method comprising the further steps of:

modifying said application program to create a resource list, said resource list for containing a listing of said plurality of data elements of said first data file in the order which they are first accessed by said application program, said modifying step including the further steps of:

(a) sequentially accessing said data elements, (b) for each data element accessed by said application program, determining if said data element is contained in said resource list, and (c) responsive a determination by said determining step that said data element is not contained in said resource list, listing said data element in said resource list;

creating said resource list by executing said application program modified by said modifying step;

appending said resource list to said first data file; and creating said second data file having said data elements stored therein in the order said data elements are listed in said resource file by appending said data element to said second data file.

14. The method of claim 13 wherein said wherein said listing step comprises the further step of listing said data element by data type and identification number.

15. The method of claim 14, responsive to said step of creating said second data file from said first data file, comprising the further step of executing said application program, whereby said application program accesses said second data file.

* * * * *